United States Patent [19]
Toogoo et al.

[11] 3,892,895

[45] July 1, 1975

[54] METHOD FOR ADHERING POLYAMINO ACID COATING TO PLASTICIZED POLYVINYL CHLORIDE

[75] Inventors: Kazushi Toogoo; Mineo Yamagata; Akira Akamatsu, all of Kawasaki, Japan

[73] Assignee: Ajinomoto Co., Inc., Tokyo, Japan

[22] Filed: May 21, 1973

[21] Appl. No.: 362,171

Related U.S. Application Data

[63] Continuation-in-part of Ser. No. 250,066, May 3, 1972, abandoned.

[30] Foreign Application Priority Data

May 11, 1971  Japan.............................. 46-31434

[52] U.S. Cl. ................ 427/385; 427/407; 428/904; 260/77.5 AT
[51] Int. Cl. ........................ B32b 27/30; D06n 3/04
[58] Field of Search ............ 117/83, 72, 76 F, 76 T, 117/81, 138.8 UA, 161 KP, 164

[56] References Cited
UNITED STATES PATENTS

| | | | |
|---|---|---|---|
| 3,549,569 | 12/1970 | Farah et al................ | 117/161 KP X |
| 3,557,180 | 1/1971 | Hoeschele................. | 117/161 KP X |
| 3,669,717 | 6/1972 | Akamatsu et al...................... | 117/72 |
| 3,691,134 | 9/1972 | Feldman et al.......... | 117/161 KP X |
| 3,719,520 | 3/1973 | Fujimoto et al.............. | 117/76 F X |
| 3,729,366 | 4/1973 | Fujimoto et al. ......... | 117/161 KP X |

*Primary Examiner*—Ralph Husack
*Attorney, Agent, or Firm*—Hans Berman; Kurt Kelman

[57] ABSTRACT

Top coatings of polyamino acids adhere firmly to plasticized polyvinyl chloride over a primer of an elastomeric polyurethane prepared from a urethane prepolymer having available NCO groups and a chain extender having active hydrogen if the isocyanate moiety of the prepolymer or the chain extender contains at least one cyclohexane ring. The primer also prevents plasticizer migration.

5 Claims, No Drawings

METHOD FOR ADHERING POLYAMINO ACID COATING TO PLASTICIZED POLYVINYL CHLORIDE

This application is a continuation-in-part of the copending application Ser. No. 250,066, filed May 3, 1972, and now abandoned.

This invention relates to objects having a plasticized polyvinyl chloride base and a top coating of a polyamino acid, and more particularly to a method of providing a plasticized polyvinyl chloride object with a firmly adhering layer of a poly-α-amino acid, the latter term being employed broadly to encompass polymers of monoesters of acidic amino acids and N-acyl derivatives of basic amino acids.

Plasticized polyvinyl chloride in its various forms including plastisols and cellular forms is a desirable base material for artificial leather, but its surface lacks the appearance and touch commonly associated with leather. Polymers of α-amino acids are more similar to natural leather, but lack the necessary mechanical strength. A polyvinyl chloride base carrying a top coating of a polyamino acid combines the desirable properties of both materials, but an intermediate or primer coating is required to make the polyamino acid adhere adequately to the plasticized polyvinyl chloride, and to prevent plasticizer migration which would mar the appearance of the product and make the surface of the top coating tacky.

Various primers proposed heretofore include polymers of acrylic esters, polyvinyl acetate, polyamides, and polyurethanes. Homopolymers and copolymers of polyvinyl chloride having a degree of polymerization of 500 or less were disclosed as primers in the commonly owned U.S. Pat. No. 3,669,717. They provide good adhesion to a polyamino acid top coating and resistance to plasticizer migration which is adequate under all but the most unfavorable conditions.

It has now been found that superior adhesion and even better resistance to plasticizer migration can be had from a primer coating essentially consisting of an elastomeric polyurethane prepared from a prepolymer having available NCO groups and a chain extender having a reactive hydrogen atom if the polyisocyanate moiety of the prepolymer and/or the chain extender includes a cyclohexane ring. The advantages of such a primer are largely lost if the cyclohexane ring is replaced by a benzene ring or an open hexane chain.

The manner in which the plasticized polyvinyl chloride base is prepared and its composition have been found not to affect the superiority of the primers of the invention over other polyurethanes and the best primers of other types available heretofore. The polyvinyl chloride (PVC) base thus may be prepared by calendering, extrusion, or molding of a composition in which the PVC is initially present in the form of solid particles. The nature of the plasticizer is equally irrelevant to the success of the primer coatings of the invention. These primers have been used successfully on PVC plasticized with all the conventional types of plasticizers including esters of dibasic organic acids or of phosphoric acid, castor oil derivatives, epoxidized vegetable oils, ethyleneglycol derivatives, polyesters, chlorinated paraffin, and chlorinated fatty acid esters. Stabilizers, fillers, lubricants, pigments, blowing agents, and like conventional compounding ingredients are equally tolerated. PVC bodies shaped from PVC latex, plastisols, and organosols by coating, dipping, vacuum molding, slush molding or centrifugal molding have been coated successfully with polyamino acids over primer coatings of this invention.

The elastomeric urethane resins of the invention are prepared in a conventional manner by reacting an organic diisocyanate or other polyisocyanate with a chemical compound containing active hydrogen. Such compounds may be defined broadly as characterized by giving a positive Zerewitinoff test, and may have available hydroxyl groups, primary and secondary amino groups, hydrogen on certain activated methylene groups, thiol, or carboxyl groups and are employed in an amount to produce a polyurethane prepolymer having available NCO groups which may then be reacted further with a chain-extending agent having active hydrogen to produce an elastomeric polyurethane. At least one cyclohexane ring must be present either in the diisocyanate moiety of the urethane prepolymer or in the chain extender moiety of the polyurethane, and both moieties may include cyclohexane rings, all other constituent elements being conventional.

A polyisocyanate may have one or more isocyanyl groups bound directly to the cyclohexane ring or connected to the ring by carbon chains as in isocyanatoalkyl, isocyanatoalkenyl, and isocyanatoalkynyl cyclohexane. Suitable diisocyanates thus include 4-isocyanato-(4-isocyanato-cyclohexyl)-cyclohexane, 4-isocyanato-3-methyl-(3-methyl-4-isocyanato-cyclohexyl)-cyclohexane, 4-isocyanato-3-n-propyl-(3-n-propyl-4-isocyanato-cyclohexyl)-cyclohexane, di-(4-isocyanatocyclohexyl)-dimethylmethane, di-(2-methyl-4-isocyanatocyclohexyl)-methane, di-(3-methyl-4-isocyanato-cyclohexyl)-methane, di-(3-methyl-4-isocyanato-cyclohexyl)-dimethylmethane, di-(4-isocyanatocyclohexyl)-cyclohexylmethane, di-(4-isocyanato-cyclohexyl)-methylethylmethane, 1-isocyanato-3-isocyanatomethyl-3,5,5-trimethylcyclohexane, (4-methyl-4-isocyanatocyclohexyl)-dimethyl-isocyanatomethane, 1-isocyanatomethyl-2-ω-isocyanato-n-propyl-3,5-dimethylcyclohexane, di-(4-isocyanatocyclohexyl)-methane, and the like. Analogous polyisocyanates suitable for primer coatings of this invention may contain cyclohexane rings also in the form of decahydronaphthalene rings, dicyclohexyl ether, or dicyclohexyl ketone.

The compounds having active hydrogen atoms which react with the diisocyanates in the formation of prepolymers preferably are macromolecular compounds, such as polyesters or polyethers, carrying functional groups which include an active hydrogen, as is known in itself in this art.

Suitable polyesters are prepared by condensing dibasic acids with polyhydric alcohols in proportions to leave available hydroxyl groups in the polyester which forms readily at elevated temperature under conditions causing removal of the water formed by esterification. The acids employed may include, but are not limited to, succinic, glutaric, adipic, pimelic, suberic, sebacic, phthalic, oxalic, methyladipic, maleic, fumaric, hexahydrophthalic, itaconic, and isosebacic acid, and representative polyhydric alcohols are ethyleneglycol, propyleneglycol, 1,2-butanediol, 1,4-butanediol, hexamethyleneglycol, glycerol, pentaerythritol, trimethylolpropane, hexanetriol, and trimethylolethane. Polyesters, of course, may be prepared from more than one acid and/or more than one alcohol.

Polyethers capable of forming polyurethane prepolymers with polyisocyanates, that is, compounds having at least two isocyanyl groups in the molecule, include the products obtained from alkylene oxides, such as ethylene oxide, propylene oxide, butene oxide in the presence of initiators having active hydrogen, such as water, glycols, diamines, and aminoalcohols, also polytetramethylene glycol ethers prepared by polymerization of tetrahydrofuran in the presence of acid catalysts; and copolymers of polytetramethylene glycol ether, ethylene oxide, and propylene oxide.

The molecular weights of the polyesters or polyethers are selected in accordance with the desired Young's modulus of the elastomer ultimately produces, and are generally between 200 and 10,000.

The chain extending agents having active hydrogen and capable of reacting with the isocyanyl groups of the prepolymer may be chosen widely if the isocyanato maoity of the prepolymer already contains a cyclohexane ring, but they too may contain a cyclohexane ring. Such a ring in the chain extender is necessary if the prepolymer is of the conventional type, that is, free from cyclohexane rings.

Chain extenders suitable for introducing cyclohexane rings into an elastomeric polyurethane of the invention include 1,4-diaminocyclohexane, diaminodecalin, diaminomethylcyclohexane, di-(4-aminocyclohexyl)-methane, di-(4-aminocyclohexyl)-dimethylmethane, di-(4-amino-3-methylcyclohexyl)-methane, 4,4'-diaminodicyclohexyl, and other diamines corresponding to the diisocyanates mentioned above, also the corresponding diols and aminoalcohols, including 1,4-dihydroxycyclohexane and 4-amino-cyclohexanol.

The chain extending reaction is preferably carried out in a liquid organic medium in which the urethane prepolymer is dissolved. The solvents commonly employed in preparing conventional polyurethane are equally useful in preparing the primer solutions of the invention and include methylene dichloride, 1,2-dichloroethane, 1,1,2-trichloroethane, benzene, toluene, xylene, chlorobenzene, dichlorobenzene, ethyl acetate, butyl acetate, acetone, methylethylketone, methylisobutylketone, dimethylformamide, diethylformamide, dimethylacetamide, N-methylpyrrolidone, ethylene carbonate, dimethylsulfoxide, dioxane, tetrahydrofuran, and hexamethylphosphoramide.

When the chain extender contains at least one cyclohexane ring, the urethane prepolymer may be of any conventional type and be based on a wide variety of polyisocyanates including tolylene diisocyanate, diphenylmethane-4,4'-diisocyanate, hexamethylene diisocyanate, xylene-ω,ω'-diisocyanate, 1,5-naphthalene diisocyanate, 4,4'-diphenyl ether diisocyanate, p-phenylene diisocyanate, di-(4-isocyanatophenyl)-dimethylmethane, dibenzyl-4,4'-diisocyanate, stilbene-4,4'-diisocyanate, and benzophenone-4,4'-diisocyanate.

When a cyclohexane ring is present in the prepolymer, the chain extender may be chosen from a wide variety of compounds of which the following are merely typical: ethylenediamine, propylenediamine, tetramethylenediamine, hexamethylenediamine, N,N'-dimethylethylenediamine, 3,9-bis(3-aminopropyl)-2,4,8,10-tetroxaspiro[5,5]undecane, polyoxyethylenediamine, polyoxypropylenediamine, diaminobenzene, diaminotoluene, diaminonaphthalene, diaminoxylene, 4,4'-diaminophenyl ether, di-)4-aminophenyl)-dimethylmethane, 4,4'-diaminodibenzyl, 4,4'-diaminostilbene, 4,4'-diaminobenzophenone, di-(4-amino-3-methylphenyl)-methane, di-(4-amino-3-chlorophenyl)-methane, ethyleneglycol, propyleneglycol, 1,2-butanediol, 1,4-butanediol, hexamethyleneglycol, glycol, also polyethylene glycol, polypropylene glycol, and polybutylene glycol, ethanolamine, N-methylethanolamine, N-methyldiethanolamine, propanolamine, hydrazine, glycerol, pentaerythritol, trimethylolpropane, hexanetriol, and trimethylolethane.

The reaction of the chain extender with the polyurethane prepolymer directly yields a solution of the desired elastomeric polyurethane resin which may be employed as such for coating the surface of a body of plasticized PVC, or may be diluted with an organic solvent to suit the chosen method of application, concentrations of 1 to 30% by weight being normally preferred. In either event, the polyurethane solution is applied at such a rate that the weight of the dry primer coating obtained after removal of the solvent is betweeen approximately 0.2 g and 50 g per square meter of treated PVC surface. The adhesion of a polyamino acid top coating to plasticized PVC is usually inadequate when the primer coating is lighter than 0.2 g/m$^2$, and the desired touch and softness of the ultimate laminar coating are imparied if the polyurethane layer is heavier than 50 g/m$^2$.

The primer layer may be applied by any conventional method, as by brushing, spraying, roller coating, dipping, and the like, and the same choice of application methods is available for depositing the top coating on the primer after the latter has been substantially completely dried by evaporation of the solvent.

The poly-α-amino acid coating may contain one or more homopolymers of an amino acid, copolymers of several amino acids, and the usual additives including other macromolecular compounds, plasticizers, antistatic agents, coloring agents, and flame retardents, but the essential characteristics of the top coatings are determined by the content of amino acid polymer. Polymers which may be employed singly or in mixtures include the homopolymers of glycine, alanine, phenylalanine, leucine, isoleucine, valine, norvaline, norleucine, methionine, γ-methylglutamate, γ-ethyl glutamate, γ-butyl glutamate, β-ethyl aspartate, β-butyl aspartate, ε-N-acetyllysine, ε-N-butyroyllysine, ∂-N-acetylornithine, and ∂-N-butyroylornithine, and copolymers of one or more of these amino acids, for example, methionine-leucine copolymer or alanine-γ-methyl glutamate copolymer.

The afore-mentioned other macromolecular compounds include elastomers such as polybutene, natural rubber, polychloroprene, acrylonitrile-butadiene copolymer, polybutadiene, chlorosulfonated polyethylene, also polyvinyl acetate, vinyl chloride-vinyl acetate copolymer, polyalkyl acrylate and methacrylate, and urethane prepolymers.

The top coating is applied in an organic liquid which is a solvent at least for the polyamino acid and may include minor amounts of non-solvents. Typical solvents for polyamino acids are methylene dichloride, 1,2-dichloroethane, 1,1,2-trichloroethane, benzene, xylene, toluene, monochlorobenzene, dichlorobenzene, ethyl acetate, butyl acetate, acetone, methylethylketone, methylisobutylketone, dimethylformamide, diethylformamide, dimethylacetamide, N-methylpyrrolidone, and their mixtures.

The following Examples are further illustrative of this invention:

EXAMPLE 1

A polyester was prepared in a conventional manner by condensing 1,4-butanediol with adipic acid. It had a hydroxyl value of 107 and an acid value of 0.9.

1,650 g Polyester was gradually added to 500 g di-(4-isocyanatocyclohexyl-dimethylmethane with stirring at 100°C under a nitrogen blanket. The addition was completed in one hour. The temperature of the mixture was raised thereafter to 120°C, and stirring continued for 4 hours. The mixture was then cooled quickly. It consisted of a urethane prepolymer having an NCO content of 2.75%.

The prepolymer was dissolved in 2,950 g anhydrous dimethylformamide, and the solution was mixed at 70°C with a solution of 8.5 g carbodihydrazide and 1.0 g dibutylamine in 2,950 g anhydrous dimethylformamide. Stirring was continued until a viscosity of about 55,000 centipoise was reached. This product, which contained 25% polyurethane and 75% dimethylformamide, will be referred to hereinafter as primer solution A. All percentage values and parts in this specification are by weight, unless stated otherwise

EXAMPLE 2

1,300 g Polyester, prepared as in Example 1, was dried and stirred gradually at 80°C into 508 g di-(4-isocyanatocyclohexyl)-methane under a nitrogen blanket. Addition was completed in 1 hour, and stirring was continued for four hours at 120°C. Upon cooling, there was obtained a prepolymer containing 2.83% available NCO groups.

The prepolymer was dissolved in 1,500 g anhydrous dimethylformamide, and the solution was mixed at 70°C with 59 g carbodihydrazide in 4,000 g anhydrous dimethylformamide. The mixture was stirred until its viscosity reached about 52,000 centipoise. The solution so obtained weighed 7,367 g and contained 25% polyurethane. It will be referred to hereinafter as primer solution B.

EXAMPLE 3

A polyester was prepared by condensing 1,4-butanediol with maleic acid in a conventional manner. It had a hydroxyl value of 78 and an acid value of 0.7.

1,700 g Polyester was dried and gradually added to 581 g di-(3-methyl-4-isocyanatocyclohexyl)-methane at 100°C with stirring under a nitrogen blanket. The addition was completed in one hour, but stirring was continued for four more hours, whereupon the mixture was cooled quickly. It consisted of a urethane prepolymer containing 2.64% NCO.

A solution of this prepolymer in 4,000 g anhydrous dimethylformamide was mixed at 40°C with 47 g ethylenediamine dissolved in 2,990 g anhydrous dimethylformamide, and stirring was continued at the same temperature until the viscosity reached 54,000 centipoise.

The solution so obtained (primer solution C) contained 25% polyurethane.

EXAMPLE 4

Ethylene glycol and adipic acid were condensed to produce a polyester having a hydroxyl value of 58 and an acid value of 1.1.

2,160 g Polyester was dried and stirred into 444 g (4-methyl-4-isocyanatocyclohexyl)-dimethyl-isocyanatomethane at 100°C over a period of about 1 hour under a nitrogen blanket. Thereafter, stirring was continued for 4 hours at 120°C, and the liquid was cooled. It was a urethane prepolymer containing 2.23% NCO.

A solution of the prepolymer in 5,000 g anhydrous dimethylformamide was mixed with a solution of 35 g hydrazine hydrate in 5,000 g of the same solvent. The mixture was stirred at 40°C until its viscosity reached about 59,000 centipoise. It then constituted a 25% polyurethane solution in dimethylformamide, referred to hereinafter as primer solution D.

EXAMPLE 5

1,690 g Anhydrous polyethylene glycol having a molecular weight of about 2,000 was added with stirring to 444 g 1-isocyanato-3-isocyanatomethyl-3,5,5-trimethylcyclohexane at 100°C under a nitrogen blanket. The addition was completed in one hour, and the mixture was further stirred at 120°C for 4 hours and cooled. It consisted of a urethane prepolymer having an NCO content of 2.31%.

A solution of this prepolymer in 3,500 g anhydrous dimethylformamide was mixed with a solution of 32 g hydrazine hydrate in 3000 g dioxane. The mixture was stirred until its viscosity reached about 43,000 centipoise. The resulting 25% polyurethane solution will be referred to hereinafter as primer solution E.

EXAMPLE 6

Adipic acid was condensed with an equimolecular mixture of ethyleneglycol and 1,4-butanediol, and the resulting polyester had a hydroxyl value of 186 and an acid value of 0.8.

880 g Polyester was dried and added with stirring to 444 g 1-isocyanato-3-isocyanatomethyl-3,5,5-trimethylcyclohexane at 100°C under a nitrogen blanket over a period of approximately 1 hour, and stirring was continued for an additional 4 hours at 150°C. The mixture then was cooled quickly and was a polyurethane prepolymer containing 3.11% NCO.

A solution of the prepolymer in 1000 g anhydrous dimethylformamide was mixed at 70°C with a solution of 44 g carbodihydrazide in 3,100 g anhydrous dimethylformamide. Stirring was continued until the viscosity of the mixture reached about 53,000 centipoise, and a 25% polyurethane solution (primer solution F) in dimethylformamide was obtained.

EXAMPLE 7

1,240 g Anhydrous polypropyleneglycol having a molecular weight of approximately 1000 was added with stirring over a period of about one hour to 360 g 1-methyl-2,4-diisocyanatocyclohexane at 80°C under nitrogen. Stirring thereafter was continued for 3 hours at 120°C, and the mixture was cooled quickly. The urethane prepolymer so produced contained 3.27% NCO.

1,600 g Prepolymer was dissolved in 2,000 g anhydrous dioxane and mixed with a solution of 115 g 1- amino-3-aminomethyl-3,5,7-trimethylcyclohexane in 3,150 g anhydrous dioxane. The mixture was stirred until its viscosity was 71,300 centipoise, and the resulting 25% solution of polyurethane will be referred to hereinafter as primer solution G.

EXAMPLE 8

36 Parts propyleneglycol, 90.8 parts sebacic acid, and 16.6 parts terephthalic acid (all parts being by weight) were condensed in a conventional manner to produce a polyester having a hydroxyl value of 109 and an acid value of 3.0.

300 g Polyester was gradually added to 100 g 4,4'-diisocyanato-diphenylmethane, and the mixture was stirred 3 hours at 100°C and thereafter diluted with 400 g dimethylformamide.

This urethane prepolymer solution was added dropwise with stirring to 13 g 1,4-diaminocyclohexane in 565 g dimethylformamide at 50°C. The chain extending reaction took place almost instantaneously. Upon cooling to 25°C, the polyurethane solution had a viscosity of 47,000 centipoise (primer solution H).

EXAMPLE 9

A polyester having a hydroxyl value of 60 and an acid value of 2.4 was prepared from 172 parts hexahydrophthalic acid and 135 parts hexamethyleneglycol.

360 g Polyester was mixed with 33.6 g hexamethylenediisocyanate and 17.4 g 2,4-diisocyanatotoluene, and the mixture was stirred at 100°C for 3 hours, thereafter at 140°C for 2 hours, and ultimately diluted with 780 g dimethylformamide. The diluted prepolymer solution was cooled to 25°C, mixed with 12.2 g trans-1,4-dihydroxycyclohexane and again stirred 5 hours at 140°C to produce a polyurethane solution containing 35% non-volatile material and having a viscosity of 215,000 centipoise at 25°C (primer solution I).

EXAMPLE 10

Tetrahydrofuran was polymerized in a known manner to produce 480 g polytetramethylene ether glycol having a molecular weight of about 1600, 84.8 g 1,5-diisocyanatonaphthalene was added, and the mixture was stirred at 100°C for 3 hours before being diluted with 565 g dimethylformamide.

The urethane prepolymer solution so obtained was added dropwise with stirring to 13.9 g 4-hydroxcyclohexylamine in 786 g dimethylformamide at 50°C, the temperature of the mixture was then raised to 130°C, and stirring continued for 2 hours to complete the reaction.

The polyurethane solution so obtained (primer solution J) had a viscosity of 430,000 cps at 25°C.

EXAMPLE 11

300 g Polyetheyleneglycol having an approximate molecular weight of 1000 was added to 104.8 g di-(4-isocyanatocyclohexyl)-methane, and the mixture was stirred at 130°C for 3 hours, diluted with 405 g dimethylformamide, and cooled to 25°C.

The prepolymer solution so obtained was mixed with 25 g di-(4-hydroxycyclohexyl)-methane, and the mixture so obtained was stirred at 140°C for 5 hours to produce a polyurethane solution (primer solution K) having a viscosity of 61,000 centipoise at 25°C.

EXAMPLE 12

For comparison purposes, polyurethane primer solutions free from cyclohexane rings in the prepolymer moiety and the chain extender moiety were prepared by methods closely similar to some of those described in Examples 1 to 11.

Primer solution AA was prepared from the same polyester as in Example 1, but with 500 g di-(4-isocyanatophenyl)-methane instead of the di-(4-isocyanatocyclohexyl)-dimethyl-methane. The procedure of Example 1 was generally followed, but the temperature during the preparation of the prepolymer was 100°C, and the amount of dimethylformamide was modified to produce a 25% polyurethane concentration in the primer solution.

Primer solution BB was prepared from 1300 g of the polyester eester described in Example 1 which was added with stirring to 109 g 2,4-diisocyanatotoluene at 50°C under nitrogen over a period of 1 hour. Thereafter, 301 g di-(4-isocyanatophenyl)-methane was added, and the resulting mixture was stirred at 80°C for 5hours and quickly cooled thereafter. The resulting urethane prepolymer had an NCO content of 2.83% and was dissolved in 1400 g anhydrous dimethylformamide. The solution was mixed at 40°with a solution of 59 g carbodihydrazide and 1 g dibutylamine in 3,910 g anhydrous dimethylformamide, and stirring was continued until the viscosity reached about 48,500 centipoise. The primer solution BB weighed 7,080 g and contained 25% polyurethane in dimethylformamide solution.

Primer solution CC was prepared by the method of Example 3, but the di-(3-methyl-4-isocyanatocyclohexyl)-methane was replaced by 336 g hexamethylene diisocyanate, and the amount of solvent used was adjusted to produce a 25% solution of polyurethane in dimethylformamide.

The procedure of Example 4 was modified in preparing the primer solution DD by replacing the (4-methyl-4-isocyanatocyclohexyl)-dimethyl-isocyanatomethane with 376 g ω,ω'-diisocyanato-1,3-dimethylbenzene, maintaining a temperature of 100°C during formation of the polyurethane prepolymer, and adjusting the amount of solvent to produce a 25% polyurethane primer solution.

The procedure of Example 5 was similarly modified in preparing primer solution EE. The 1-isocyanato-3-isocyanatomethyl-3,5,5-trimethylcyclohexane was replaced by 500 g di-(4-isocyanatophenyl)-methane, the prepolymer was formed at 100°C, and the amount of solvent was chosen to produce a 25% polyurethane primer solution.

EXAMPLE 13

A base sheet for artificial, mainly consisting of polyvinyl chloride and dioctyl phthalate as a plasticizer was prepared as described in Example 1 of the aforementioned earlier patent. Each of the twelve primer solutions A to G and AA to EE was diluted with tetrahydrofuran to 10% non-volatile material.

Respective pieces of the base sheet were coated with the primer solutions and dried at 130°C for 10 minutes, and the weight of the solid primer coating was determined. The primed sheet pieces and a control without primer were then coated with a 10% solution of poly-γ-methyl glutamate in a mixture of 1,2-dichloroethane and perchloroethylene in a volume ratio of 7:3. The top-coated pieces were dried for five minutes at 130°C, and the weight of each top coating was determined. Table 1 lists the dry weights of the primer coatings and of the top coatings of base sheet samples using primer colutions A to G.

TABLE I

| Primer Solution | Primer g/m² | Top coat g/m² |
| --- | --- | --- |
| A | 10.8 | 11.4 |
| A | 16.3 | 6.4 |
| B | 31.5 | 22.3 |
| C | 1.8 | 4.6 |
| C | 13.7 | 12.4 |
| D | 28.6 | 33.3 |
| E | 0.9 | 11.8 |
| F | 7.2 | 19.2 |
| G | 36.5 | 26.7 |

The nine samples prepared as described above had the expected desirable appearance and touch, and the top coat of polymethyl glutamate adhered very well to the plasticized base sheet as determined by cross cut test, test for resistance to scratching, and test for resistance to bending.

In the cross cut test, the top coating was cut through its full thickness into 1 mm squares, and an adhesive-coated plastic tape, 4 cm wide, was adhered under pressure to 100 squares and ripped off quickly. All 100 coating squares of each sample remained attached to the base sheet.

A Scotch scratch resistance tester was employed according to Japanese Industrial Standards K.6772 for 3000 cycles, and none of the nine samples failed by peeling of the top coating from the base sheet.

A Flexometer (a commercial testing device manufactured by Yasuda Seiki Co.) was employed in the test for bending resistance. None of the samples failed in 10,000 cycles.

The samples were exposed to sun light for 40 hours and then examined for appearance and tackiness. None was tacky after the exposure, nor was any loss of gloss observed that would have indicated plasticizer migration.

The primerless control and the sample of base sheet primed with primer solutions AA, BB, CC, DD, and EE were subjected to the same tests described above. The control was tacky after exposure to sunlight, but none of the other samples showed evidence of plasticizer migration. The primer weight, top coat weight, the number of squares remaining attached to the base sheet in the cross cut test, the number of cycles in the scratch resistance test required to cause peeling of the top coat, and the corresponding number of cycles to peeling in the bending test are listed in Table 2.

TABLE 2

| Primer Sol'n | Primer g/m² | Top c't g/m² | Squ's left | Scr.t't Cycles | Bend'g Cycles |
| --- | --- | --- | --- | --- | --- |
| AA | 21.4 | 17.8 | 52 | 430 | 800 |
| AA | 2.3 | 8.7 | 41 | 400 | 800 |
| BB | 8.9 | 16.5 | 38 | 350 | 810 |
| CC | 1.6 | 7.6 | 21 | 300 | 750 |
| CC | 19.3 | 15.7 | 33 | 300 | 800 |
| DD | 15.7 | 21.6 | 47 | 500 | 800 |
| EE | 3.5 | 7.9 | 36 | 550 | 1000 |
| None | — | 15.8 | 0 | 10 | 5 |

As is evident from this Example, the polyurethane resins of the invention which have cyclohexane rings at least in their prepolymer moieties are far superior as adhesion-promoting primers for the intended purpose to closely related polyurethane resins having aliphatic hexane chains or benzene rings in their prepolymer moieties.

EXAMPLE 14

A plasticized polyvinyl chloride base sheet for artificial leather was prepared by calendering 100 parts polyvinyl chloride powder (Geon 103 EP-1), 45 parts dioctyl phthalate, 20 parts dibutyl phthalate, 1 part tribasic lead sulfate, 0.8 part lead stearate, and approximately 2 parts coloring agent (Finess 30 Black H), and by laminating the product in a thickness of 1 mm on a knitted staple fiber fabric.

The base sheet so produced was coated with primer solution A which had been diluted to 10% non-volatile matter with tetrahydrofuran. The primer weight was 0.8 g/m² after 2 minutes drying at 130°C. The primed base sheet was further covered with a top coating solution of 10 parts poly-$\gamma$-ethyl glutamate, 63 parts ethyl acetate, and 27 parts methyl isobutyl ketone, applied by means of a knife coater at a slit width of 0.1 mm. The top coating was dried 3 minutes at 130°C and then embossed between rollers under pressure to give it the appearance of natural leather.

The artificial leather so prepared withstood the cross cut test, the scratching test, the bending test, and exposure to sun light with the same results as described with reference to primer solutions A to G in Example 13.

When the primer solutions H, I, J, and K were applied to respective pieces of the same base sheet in amounts of 0.8 g on a dry basis, covered with a top coating of 9.3 g/m² polyethyl glutamate, and the artificial leather pieces so prepared were submitted to the tests outlined above, no squares were removed by the cross cut test, no changes were observed in the scratch test, and all samples went through 16,000 cycles of the bending resistance test without showing evidence of peeling. No plasticizer migration could be observed as tackiness or change in surface gloss of samples exposed to sunshine.

The polyurethane resins in primer solutions H, I, and J have cyclohexane rings in the chain extender only, and the resin of solution K has cyclohexane rings in both the isocyanate moiety of the prepolymer and the chain extender.

EXAMPLE 15

A paste of 100 parts polyvinyl vhloride powder (Geon 121), 50 parts dioctyl phthalate, 50 parts epoxidized soybean oil, 5 parts dibasic lead phosphate, 4 parts titanium white, 10 parts foaming agent, and 7 parts of a commercial viscosity increasing agent was spread in a thickness of about 1 mm on a knitted staple fiber fabric with a knife coater. The coated fabric was heated to cause gelation and foaming of the coating, and then cooled to ambient temperature.

Primer solution B was applied by means of a knife coater and was dried 1 minute at 150°C. The dry primer coating weighed 18.7 G/m².

The primed material was further coated with a mixture of 100 parts "Ajicoat $\gamma$-100" (mostly poly-$\gamma$-methyl glutamate), 5 parts coloring agent (ARS Color White), 0.3 part Aerosil K-412 (colloidal silica) and enough trichloroethylene to make the viscosity of the mixture 100 centipoise. A gravure coater was employed, and the coating was dried one minute at 80°C.

The artificial leather produced fully withstood the several tests for adhesion and plasticizer migration described in Example 13.

EXAMPLE 16

An extruded sheet, 1.5 mm thick, was prepared from a mixture of 100 parts polyvinyl chloride powder (Geon 103 EP), 15 parts dioctyl phthalate, 15 parts butyl benzyl phthalate, and 1.5 parts of a commercial stabilizer containing barium and cadmium. The sheet was brushed on both sides with primer solution C that had been thinned to 10% non-volatile matter with ethyl acetate and dried 20 minutes at 80°C. Each primer coating weighed 21.8 g/m².

The primed surfaces were sprayed with a solution of 5 parts of a copolymer of γ-methyl and γ-isopropyl glutamate (mole ratio 9:1) in 65 parts methylene chloride and 30 parts toluene, and the sprayed top coat was dried 20 minutes at 80°C.

The coated surface was uniformly glossy and had a pleasant touch. The coated vinyl sheet successfully passed the tests for adhesion and plasticizer migration described in Example 13.

EXAMPLE 17

Primer solution D was diluted with a mixture of methylethylketone and dimethylformamide (19:1 by volume) to 5% nonvolatile matter, sprayed on the polyvinyl chloride base sheet described in Example 13, and dried at 100°C for 10 minutes. The dry primer coating weighed 32.8 g/m². It was covered with a solution of 10 parts poly-γ-methyl glutamate in 63 parts ethylene dichloride and 27 parts perchloroethylene from an applicator having a 0.5 mm slit, and the top coat was dried at 80°C in 20 minutes.

The artificial leather so produced fully met the tests for adhesion and plasticizer migration described in Example 13.

EXAMPLE 18

A plasticized polyvinyl chloride base sheet was prepared as in Example 13 and was coated with primer solution E, diluted to 10% non-volatile material with tetrahydrofuran, by means of a knife applicator having a slit 0.2 mm wide. The dry weight of the primer coating was 14.6 g/m². The primed base sheet was coated with a solution of 10 parts poly-β-methyl aspartate in 90 parts ethylene dichloride by means of an applicator having a slit 0.5 mm wide, and the top coating was dried 20 minutes at 80°C.

The smooth artificial leather so produced passed all the tests described in Example 13.

EXAMPLE 19

The primer solution F was diluted with ethylene dichloride to 15% polyurethane content and applied to a polyvinyl chloride sheet as described in Example 13 through an applicator slit of 0.5 mm. The dried primer weighed 12.8 g/m². It was further covered, at the same applicator setting, with a solution of 10 parts methionine-leucine copolymer (mole ratio 4:6) in 90 parts benzene and dried.

The appearance, adhesion, and resistance to plasticizer migration of the artificial leather obtained was equal to the corresponding properties of other products of the invention, as described in Example 13.

EXAMPLE 20

Primer solution G was diluted with dioxane to 10 % polyurethane, applied to the polyvinyl chloride base sheet described in Example 13 through a 0.2 mm applicator slit, and dried to a primer weight of 9.8 g/m². The primed base sheet was coated with a solution of 10 parts alanine-δ-carbobenzoxyornithine copolymer (mole ratio 8:2) in 90 parts ethylene dichloride through an applicator slit 0.5 mm wide, and dried.

The artificial leather so produced had a uniform, glossy appearance and had a pleasant touch. It successfully withstood the adhesion and plasticizer migration tests described in Example 13.

What is claimed is:

1. A method of coating a surface of a body of plasticized polyvinyl chloride which comprises:
   a. applying to said surface a primer solution essentially consisting of volatile organic solvent and of an elastomeric polyurethane dissolved in said solvent,
      1. said polyurethane being the product of a chain extending reaction between a urethane prepolymer having available isocyanato groups and a chain extending agent having active hydrogen,
      2. said prepolymer being the product of a reaction between an organic polyisocyanate and an organic compound having active hydrogen,
      3. said polyisocyanate having a cyclohexane ring in the molecule thereof,
      4. one of the isocyanato groups of said polyisocyanate being bound to said ring directly or through alkylene only;
   b. removing said solvent to deposit said polyurethane on said surface; and
   c. coating said surface carrying said polyurethane with a top coating essentially consisting of poly-α-amino acid.

2. A method as set forth in claim 1, wherein said organic compound is a polyether or polyester having a molecular weight of 200 to 10,000.

3. A method as set forth in claim 2, wherein said ring is in the molecule of said polyisocyanate and directly bound to an isocyanato group.

4. A method as set forth in claim 2, wherein said ring is in the molecule of said polyisocyanate and connected to an isocyanato group by methylene.

5. A method as set forth in claim 2, wherein the weight of the deposited polyurethane is between 0.2 and 50 grams per square meter of said surface.

* * * * *